Figure 1:
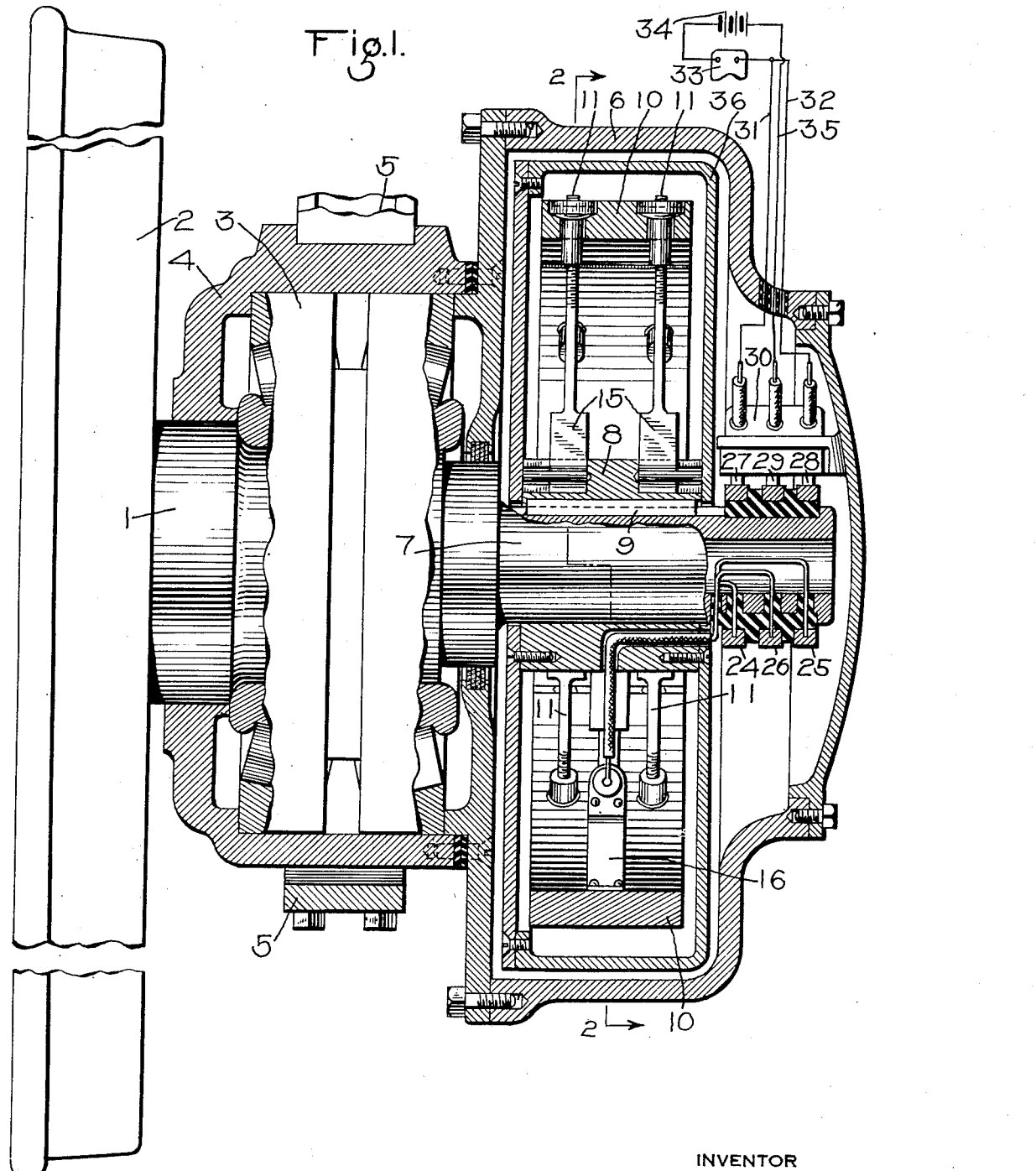

July 21, 1942.　　L. O. GRONDAHL　　2,290,588
INERTIA DEVICE
Filed April 1, 1941　　3 Sheets-Sheet 2

INVENTOR
LARS O. GRONDAHL
BY
ATTORNEY

July 21, 1942.   L. O. GRONDAHL   2,290,588
INERTIA DEVICE
Filed April 1, 1941   3 Sheets-Sheet 3
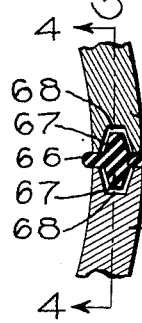
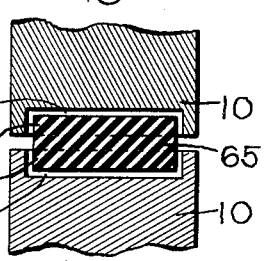
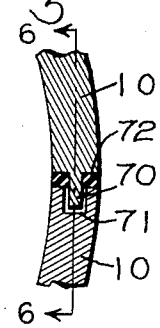
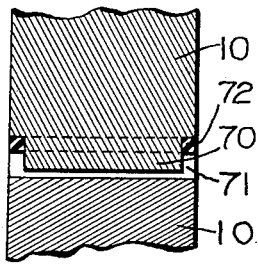
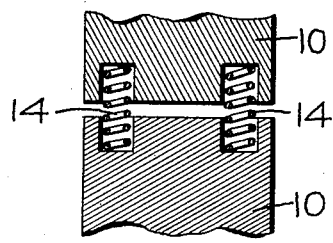
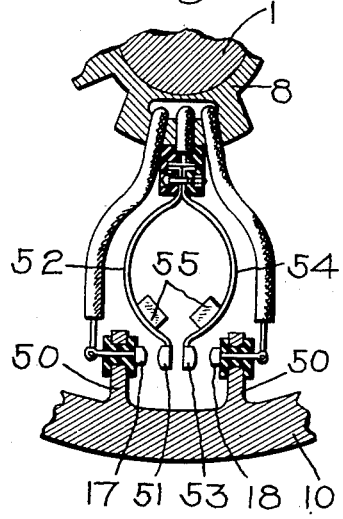
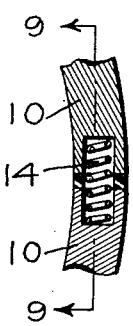
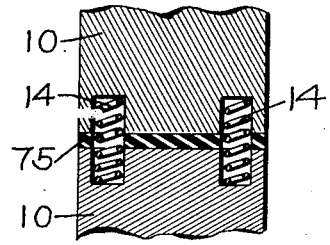
INVENTOR
LARS O. GRONDAHL
BY
ATTORNEY Patented July 21, 1942

2,290,588

UNITED STATES PATENT OFFICE 2,290,588

INERTIA DEVICE

Lars O. Grondahl, Pittsburgh, Pa., assignor to The Westinghouse Air Brake Company, Wilmerding, Pa., a corporation of Pennsylvania Application April 1, 1941, Serial No. 386,257

18 Claims. (Cl. 264—1)

This invention relates to rotary inertia responsive control devices for registering or detecting the rate of change of speed of a rotating element, and more particularly to the mechanical type of device employing an inertia responsive fly wheel type of control element.

This type of inertia device is employed quite extensively in controlling the operation of different types of mechanism and has been found to be particularly suitable for use in conjunction with the wheels of railway vehicles for the purpose of detecting a slipping condition of a wheel, and to then be effective to cause an instantaneous release of the brakes to prevent the slipping wheel from decelerating to a locked condition and sliding. The terms "slipping" and "sliding" as employed herein are not intended to be synonymous. A slipping condition refers to the rotation of the vehicle wheel at a speed less than a speed corresponding to the vehicle speed at a given instant, and a sliding condition refers to the dragging of the wheel along a track rail or road surface in a locked or non-rotative condition.

Mechanical anti-wheel sliding devices heretofore proposed for controlling the brakes of a vehicle are usually of the type comprising an inertia element in the form of a fly-wheel which is normally driven according to the speed at which the vehicle is operated and which rocks or shifts with respect to a driving element when the associated vehicle wheel begins to slip on the rail, the fly wheel when so shifted or locked causing an associated control mechanism to effect a release of the brakes in time to prevent locking of the wheel against rotation. Various forms of inertia control devices of this type have been designed in which the fly wheel element is mounted on bearings which are designed to minimize the effect of friction on the sensitivity of the device.

When such bearings are new and properly lubricated, the resistance they offer to the controlling movement of the inertia element will be negligible. However, if the bearings are not kept free of dirt and are not lubricated properly they may offer sufficient resistance to the controlling movement of the inertia element as to cause the element to operate erratically and thereby either impair or eliminate the desired accurate control of the brakes.

It is an object of my invention to provide an improved inertia control device of the above type in which the fly wheel inertia element will be operatively mounted without employing friction bearings and will therefore be free of the above mentioned difficulties.

This object I attain by means of an inertia element having a hub portion which is rigidly secured to the driving element for rotation therewith, and having a divided contractable and expansible circular rim portion rigidly secured to the outer end portions of radially arranged spoke like elements which have their inner ends rigidly secured to the hub portion and which are flexible so as to permit relative rotary controlling movement between the hub and rim portion.

Figure 2:
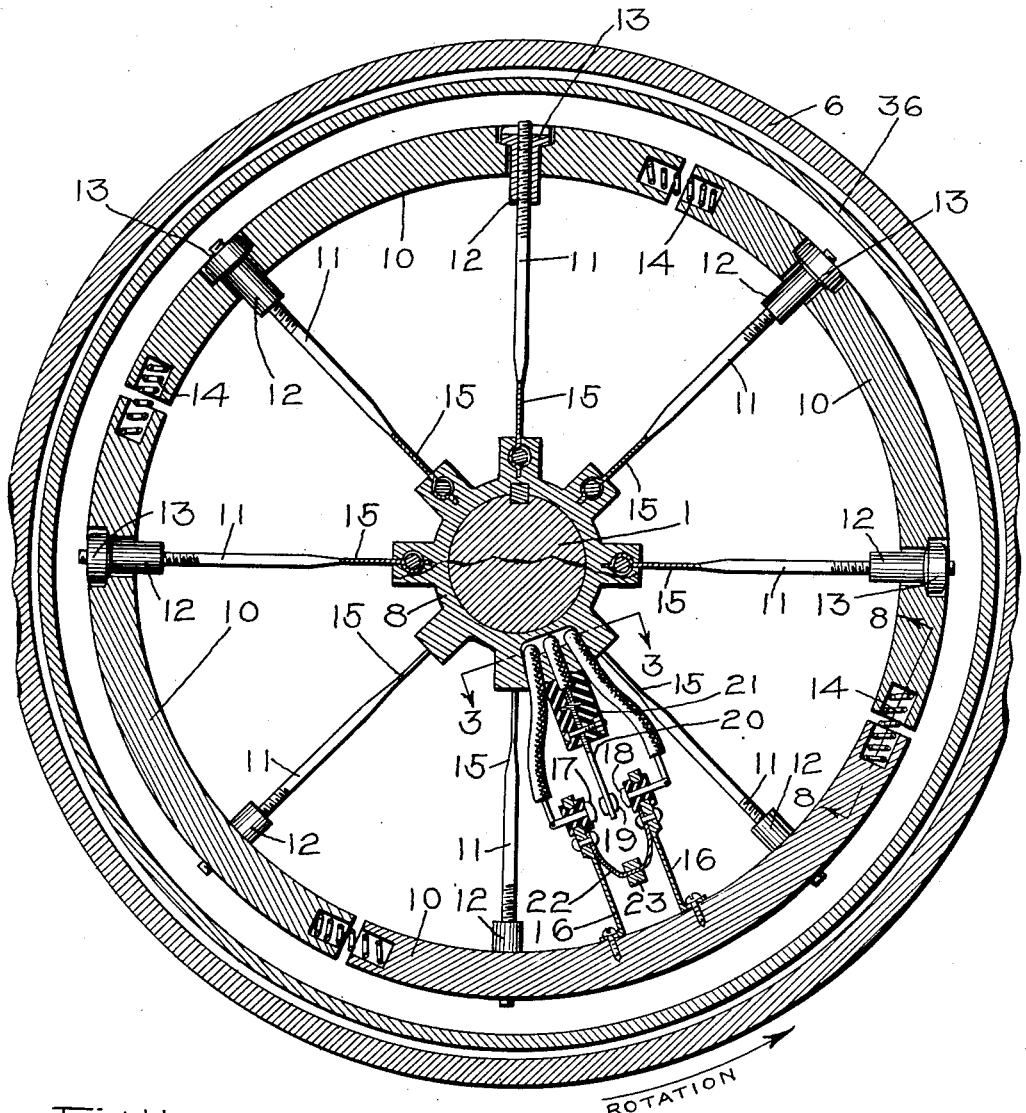
Figure 11:
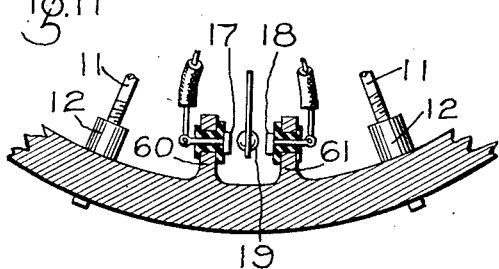

Other objects and advantages of the invention will appear in the following more detailed description thereof taken in conjunction with the accompanying drawings, in which:

Fig. 1 is a fragmentary vertical sectional view of a railway vehicle truck showing a wheel and axle assembly with the improved rotary inertia control device mounted thereon; Fig. 2 is a sectional view taken on the line 2—2 of Fig. 1, the vehicle wheel and other parts unnecessary to a clear understanding of the invention being omitted; Fig. 3 is a fragmentary detailed sectional view taken through the adjacent portions of two sections of the rim of the inertia element, and illustrates another form of resilient connection between the rim sections; Fig. 4 is a fragmentary sectional view taken on the line 4—4 of Fig. 3; Fig. 5 is a fragmentary sectional view similar to Fig. 3 and illustrates still another form of resilient connection between the rim sections and the inertia element; Fig. 6 is a fragmentary sectional view taken on the line 6—6 of Fig. 5; Fig. 7 is a fragmentary sectional view similar to Fig. 4 and taken on the line 7—7 of Fig. 2, but illustrates a plurality of springs forming the resilient connection between the rim sections of the inertia elements; Fig. 8 is a fragmentary sectional view similar to Fig. 3 but illustrating both springs and a rubber member forming the resilient connection between the rim sections; Fig. 9 is a fragmentary sectional view taken on the line 9—9 of Fig. 8; Fig. 10 is a fragmentary sectional view illustrating another form of the invention; and Fig. 11 is a fragmentary sectional view illustrating still another form of the invention.

The rotary inertia control device, constructed in accordance with the invention, is shown and described in connection with a wheel and axle assembly of a railway vehicle for controlling the brakes of the vehicle under certain train operating conditions hereinafter more fully described, but it is to be understood that the invention is not limited to this particular use since it is obvious that it may be employed in other different types of apparatus for control purposes.

For the purpose of the present invention it is deemed unnecessary to illustrate and describe the vehicle brake equipment which, in the present embodiment of the invention, the inertia device controls, since the equipment may be the same as that shown and described in Patent No. 2,198,033 to Clyde C. Farmer.

*Description of the device shown in Figs. 1 and 2*

As shown in Fig. 1 the wheel vehicle and axle assembly comprises an axle 1 having rigidly secured thereto the usual laterally spaced wheels 2. The axle 1, adjacent each of its ends, is rotatably mounted in a bearing assembly 3 contained in a housing 4 which is carried by a truck frame 5 in the usual manner so as not to rotate with the axle.

Secured to the outer end of the housing 4 and extending outwardly therefrom is a housing 6 into which the outer end portion 7 of the axle extends and which contains the rotary inertia element of the device.

The rotary inertia element comprises a hub portion 8 which is secured to the portion 7 of the axle against rotation or unintentional longitudinal movement relative to the axle by means of a key 9, or if desired it may have a press fit with the axle. The element also comprises a rim which is concentrically arranged with respect to the hub portion 8 and axle portion 7 and is constructed of four segments 10 which are arranged in end to end relationship with each other, there being a slight space between the adjacent ends of each two adjacent segments to permit the contraction of the rim for purposes which will hereinafter more fully appear.

Rigidly secured to the hub portion 8 are a plurality of outwardly extending radially arranged spokes 11 which support the rim as a whole from the hub portion. There may be as many of these spokes provided as is found to be necessary, but as shown there are four for each segment 10 of the rim. The outer end of each spoke has screw-threaded connection with an adjusting sleeve nut 12 mounted in a suitable bore in the rim segment, which nut has an end enlargement 13 which forms a stop shoulder adapted to engage with a corresponding shoulder formed on the rim segment.

Interposed between the adjacent ends of each two adjacent rim segments 10 is a resilient member in the form of a coil spring 14. If desired two parallel springs as shown in Fig. 7 may be employed. Since there are four rim segments there will be four or eight, as the case may be, springs in the rim, and these springs, when the inertia element is assembled will be slightly compressed so that they will act to maintain the segment 10 in their concentric relationship with the hub portion 8 when the element is stationary. It should here be mentioned that the concentricity of the rim is obtained through the proper positioning of the segments 10 by means of the adjusting sleeve nut 12.

These springs 14 also serve to dampen slight unintentional endwise relative movement between the segments 10, which movement may be induced by the usual service shocks to which a railway vehicle is subjected, thus the springs tend to maintain the rim in concentric relationship of the hub portion 8 and in balance when the inertia element is in motion.

In the present embodiment of the invention the spokes 11 are preferably made of spring steel and adjacent the hub are shown flattened for a portion of their length as indicated at 15 to provide flexing zones spaced a sufficient distance from the rim segments 10 that they will readily respond to the rotative force of the segments when there is a change in the rate of rotative speed between the hub portion 8 and the rim as will be understood from the following description of the operation of the device.

Rigidly secured to the inner face of one of the rim segments 10 are two circumferentially spaced electrical contact supports 16 which extend inwardly toward the hub portion 8 and which have mounted in their free ends electrical contacts 17 and 18 which are suitably insulated from the supports and which are adapted to be separately engaged by a contact 19 carried by an arm 20 rigidly secured to the hub portion 8 by means of insulating blocks 21 carried by and rotative with the hub portion. The supports 16 are made of spring material so that they may flex either toward or away from each other. Disposed between the free ends of the supports is a flexible member 22 which is attached at each end to the free end of one of the supports 16, and on this member 22 there is mounted a weight 23 which, as will hereinafter be described, is adapted to control the flexing movement of the supports 16.

The contacts 17, 18 and 19 are connected by means of wires through the usual collector slip rings 24, 25 and 26, respectively, which are secured to and rotatable with the outer end portion of the axle, there being suitable insulating material interposed between the rings and the axle. These rings are engaged by collector brushes 27, 28 and 29, respectively, which are carried by a bracket 30 integrally or otherwise rigidly secured to casing 6. The brushes 27 and 28 may be connected by means of wires 31 and 32, respectively, to one end of the winding of a control magnet device 33, which winding may have its other end connected to the negative terminal of a battery 34 or other source of electric energy. The brush 29 may be connected by means of a wire 35 to the positive terminal of the battery 34. In the present embodiment of the invention the magnet may constitute a part of a release magnet valve device for effecting the operation of a release valve for effecting and controlling the reduction in brake cylinder pressure.

The inertia element is shown enclosed by a dirt proof casing 36 which is secured to and rotatable with the hub portion 8. If desired this casing may be omitted.

It should here be mentioned that whenever the rotational speed of the axle 1 changes, the rim segments 10 of the inertia element tends to overrun the hub if the axle is decelerating. The weight of each ring segment 10 and the bending strength of the spokes 11 connected therewith, together with outwardly directed pull on the spokes by the segment due to centrifugal force, is such that unless the speed of the axle changes at a rate exceeding a certain rate, the rim segments 10 are not displaced rotarily with respect to the hub 8 a sufficient amount to cause the contact 17 or the contact 18 to engage the contact 19. When, however, the axle 1 decelerates at a rate in excess of such certain rate, which, for example, may correspond to ten miles per hour per second deceleration of the vehicle, the rotary displacement of the rim segments is sufficient to cause the contacts 17 or 18 to engage the contact 19, thereby causing the collector ring 26 to be connected to either the collector ring 24 or the ring 25. In view of the fact that a railway car wheel of the type now in common use cannot decelerate at a rate exceeding ten miles per hour per second unless it is in a slipping condition, it will be apparent that the contact 19 and contacts 17 or 18 will engage with each other only when a wheel unit with which the device is associated begins to slip.

*Operation of the rotary inertia device shown in Figs. 1 and 2*

While as hereinbefore mentioned, the rotary inertia control device may be employed in different types of apparatus its utility will be apparent from the following description of its operation in connection with the control of railway vehicle brakes.

Assuming that a railway vehicle wheel and axle assembly, with which the rotary inertia control device is associated, is traveling along the track rails with the brakes released. The several parts of the rotary inertia element will be in substantially the same condition in which they are shown in Fig. 2, that is to say, the spokes 11 will be straight and the rim will be in its normal expanded condition.

As the inertia element is rotating the weight 23 under the influence of centrifugal force, exerts an outwardly directed radial pull on the spring 22 which causes the supports 16 to flex inwardly toward each other, thus moving the contacts 17 and 18 closer to the contact 19. It will be apparent that the higher the angular velocity of the rotary inertia element the closer the contacts 17 and 18 will be moved to the contact 19. This, as will hereinafter more fully appear, has the effect of so automatically adjusting the position of the contacts 17 and 18 that at high speeds the amount of motion required of the rim relative to the hub of the inertia element is less than at low speed.

When the operator desires to effect an application of the brakes he shuts off the propulsion power and shifts the brake valve handle of the usual brake valve device into the brake application position corresponding to the desired degree of application of the brakes.

As long as the car wheel does not slip, the contact 19 will not be engaged by the contact 17, when the wheel and inertia element are rotating in the direction indicated by the arrow in Fig. 2, or by the contact 18 if the wheel and element are rotating in the opposite direction.

Assuming that the wheel and inertia element are rotating in the direction indicated by the arrow in Fig. 2 and the wheel begins to slip, the segments 10 on the rim of the inertia element will overrun the axle and hub 8, and in so doing will flex the spokes 11 in the direction of travel of the element. The spokes as they flex contract the rim slightly against the opposing pressure of the light springs 14 as well as against the opposing centrifugal force acting on the rim segments 10 tending to maintain the spokes straight.

When the spokes yield as just described, the contact 17 will engage the contact 19 and close the electric circuit through the magnet winding and battery 34. The magnet valve now functions to vent fluid under pressure from the brake cylinders, the flow of fluid being at the usual rapid rate so as to effect a rapid reduction in brake cylinder pressure.

Due to this rapid reduction in brake cylinder pressure, the slipping wheel ceases to decelerate toward a locked condition and begins to accelerate back toward a speed corresponding to the vehicle speed without actually decelerating to a locked condition. When the wheel thus accelerates, the rim segments 10 of the inertia element shift from their overrunning position toward their normal position with relation to the hub 8, thus the contact 17 moves out of engagement with contact 19, thereby deenergizing the magnet which now functions to operate the release valve to cut off the flow of fluid from the brake cylinder.

It should here be mentioned that with the inertia element rotating at high speed, the centrifugal force of the rim segments 10 will be considerably greater than at lower speed, and since, when the vehicle wheel begins to slip, this force tends to prevent the flexing of the spokes 11, the element will be less responsive to this condition to control the release of the brakes than at the lower speed; or in other words, at high speed the rotative movement of the inertia element will be less rapid than it will be at lower speeds. However, the adjustment of the contacts 16 and 17, with relation to the contact 18, by the weight 22 acting under the influence of centrifugal force, will compensate for this variation in the responsiveness of the device, so as to produce a substantially uniform control of the brakes for all speeds.

The operator of a vehicle or train customarily reduces the degree of application of the brakes as the speed of the vehicle reduces, so that ordinarily, the reapplication of the brakes does not produce repeated slipping of the wheel. However, if for any reason the wheel does again slip, the above automatic reduction in brake cylinder pressure is repeated. Thus at no time is the wheel permitted to decelerate to a locked or non-rotative condition.

When the vehicle or train comes to a stop, the operator may release the brakes by merely restoring the brake valve handle to its brake release position in which fluid under pressure is vented from the brake cylinders to the atmosphere in the usual manner.

*Description of the apparatus shown in Fig. 10*

In Fig. 10 another form of the invention is illustrated in which the contacts 17 and 18 are rigidly mounted in spaced lugs 50 integrally formed on or otherwise rigidly secured to a rim segment 10. The contact 17 is adapted to engage with a contact 51 carried by the outer end of a flexible member 52 and the contact 18 is adapted to engage with a contact 53 which is carried by the outer end of a flexible member 54. The inner ends of the members 52 and 54 are secured to the hub 8 for rotation therewith and are both electrically connected to the selector ring 26. Intermediate their ends, these members are bowed outwardly in opposite directions, and within the bowed portion of each member there is secured to the member a weight 55. When the inertia element is rotating the weights 55 will, due to centrifugal force, cause the bowed portions of the members 52 and 54 to move farther apart from each other thus bringing the contacts carried thereby closer to the respective contacts 17 and 18. It should here be mentioned that the flexing of the members will occur at a point above the bowed portions, the bowed portions being sufficiently rigid to maintain their shape.

It will be apparent that the distance between the contacts 17 and 51 and between the contacts 17 and 53 will be automatically varied according to the rotative speed of the inertia element.

Aside from the differences noted, the construction and operation of the inertia element are identical with those hereinbefore described in connection with the element shown in Figs. 1 and 2.

*Description of the apparatus shown in Fig. 11*

In some instances it may be desirable to have the inertia element function to produce a variable control according to variations in speed of the vehicle, and in Fig. 11 the inertia element is shown embodying means for producing such control.

The only material difference in this construction and the construction shown in Figs. 1 and 2 is that the contacts 17 and 18 are rigidly mounted on spaced lugs 60 and 61, respectively, which are integral or otherwise rigidly carried by one of the rim segments 10, this construction being substantially the same as embodied in the form of the invention shown in Fig. 10.

It will be apparent that since the distances between the contacts 17 and 19 and between the contacts 18 and 19 cannot be changed by said centrifugal force, and that since the inertia element is less responsive at high speed than at low speed, the control by the inertia element will of course vary according to variations in the speed of the element.

*Description of the different forms of yieldable interlocking connections between the ring segments 10*

In Figs. 3 and 4 there is shown another form of yieldable interlocking connection between the adjacent ends of two of the rim segments 10, which connection comprises a yieldable member 65, preferably made from rubber, which is cruciform in cross section and which preferably extends across the full width of the rim. The arms 66 of this member extend between and are engaged by the ends of the segments 10 and constitute yieldable dampening means for the members. The arms 67 of the member extend at right angles to the arms 66 and are received in accommodating recesses 68 formed in the ends of the segments 10 and serve to resist relative radial movement between the segments. There is clearance provided between the outer surfaces of the arm 67 and the surfaces of the recess to insure against the arms interfering with the compression of the arms 66 when relative circumferential movement of the rim segments occur.

In Figs. 5 and 6 there is shown another form of interlocking connection between the ends of the rim segments 10, which connection comprises a tongue 70 provided in one of the segments 10 which extends into an accommodating groove 71 formed in the other rim segment. Disposed between the adjacent ends of the segments 10 and carried by the tongue 70 is an annular yieldable dampening member 72 which is preferably made from rubber. The tongue and groove connection just described will prevent undue relative radial movement between the rim segments. It will be noted that clearance is provided between the tongue and the walls of the groove for the purpose of permitting the free compression of the member 72 should relative circumferential movement between the segments occur.

The form of interlocking connection between two of the adjacent rim sections 10 shown in Fig. 7 has been described in connection with Figs. 1 and 2 and needs no further description here.

In Figs. 8 and 9 there is shown a further form of the interlocking connection between the adjacent ends of two rim segments 10. This connection is similar to that of the form shown in Fig. 7 in that it is provided with dampening springs 14. In addition, the space between the segments is filled by a yieldable dampening member 75 which is preferably made from rubber.

Each of the above described interlocking connections may be substituted for the interlocking connections shown in Fig. 2 for preventing undue relative radial movement of rim segments 10 and for cushioning or dampening relative circumferential movement between the segments.

While several illustrative embodiments of the invention have been described in detail, it is not my invention to limit its scope to these embodiments or otherwise than by the terms of the appended claims.

Having now described my invention, what I claim as new and desire to secure by Letters Patent, is:

1. A device for detecting the rate of change of speed of a rotary element, comprising, a hub rotatable with said element, an inertia member rotatable with said hub, a radially disposed spring supporting said member from said hub and constituting the driving connection from the hub to the inertia member, said spring, intermediate the hub and inertia member, being yieldable to the rotational force of the inertia member to permit rotational movement of the inertia member relative to the hub upon a change in the rotational speed of the hub, and control mechanism operative in response to the rotational movement of the inertia member relative to the hub.

2. A device for detecting the rate of change of speed of a rotary element, comprising, a hub rotatable with said element, an inertia member rotatable with said hub, spaced radially arranged spring spokes supporting said member from said hub and constituting the driving connection from the hub to the inertia member, said spokes being yieldable, between the hub and inertia member, to the rotational force of the inertia member to permit rotational movement of the inertia member relative to the hub upon a change in the rotational speed of the hub, and control means operative in response to the rotational movement of the inertia member relative to the hub.

3. A device for detecting the rate of change of speed of a rotary element, comprising, a hub secured to said element for rotation therewith, an inertia member rotatable with said hub, a radially disposed spring supporting said member from said hub and constituting the driving connection from the hub to the inertia member, said spring being yieldable to the rotational force of the inertia member to permit rotational movement of the inertia member relative to the hub upon a change in the rotational speed of the rotary element, and cooperating control means carried by said hub and by said inertia member operative in response to the rotational movement of the inertia member relative to the hub.

4. A device for detecting the rate of change of speed of a rotary element, comprising, a hub secured to said element for rotation therewith, an inertia member rotatable with said hub, a radially disposed spring supporting said member from said hub and constituting the driving connection from the hub to the inertia member, said spring being yieldable to the rotational force of the inertia member to permit rotational movement of the inertia member relative to the hub upon a change in the rotational speed of the hub, control means operative in response to the rotational movement of the inertia member relative to the hub, and means operative according to the rotative speed of the hub and inertia member for adjusting the control means.

5. A device for detecting the rate of change of speed of a rotary element, comprising, a hub secured to said element for rotation therewith, an inertia member rotatable with said hub, a radially disposed spring supporting said member from said hub and constituting the driving connection from the hub to the inertia member, said spring being yieldable to the rotational force of the inertia member to permit rotational movement of the inertia member relative to the hub upon change of rotational speed of the hub, and control means adjusted according to the speed of the hub and operative in response to the rotational movement of the inertia member relative to the hub.

6. A device for detecting the rate of change of speed of a rotary element, comprising, a hub secured to said rotary element for rotation therewith, an inertia member rotatable with said hub, a radially disposed spring supporting said member from said hub and constituting the driving connection from the element to the inertia member, said spring being yieldable to the rotational force of the inertia member to permit rotational movement of the inertia member relative to the hub upon a change in the rotational speed of the hub, and control means conditioned according to the speed of the hub for operation and being operative in response to the rotational movement of the inertia member relative to the hub.

7. A rotary inertia device comprising a hub portion adapted to be secured to a rotatable element for rotation thereby, an inertia rim portion radially expansible and contractable, and a spring spoke connecting said hub and rim portion, said spring spoke being yieldable between the hub and inertia rim portion to permit relative rotational movement between said inertia rim portion and said hub.

8. A rotary inertia device comprising a hub portion adapted to be secured to a rotatable element for rotation thereby, an inertia rim portion comprising a plurality of circumferentially spaced sections, and a spring spoke connecting said hub and each rim section, said spring being yieldable between said hub and rim section to permit relative rotational movement between each of said rim sections and said hub.

9. A rotary inertia device comprising a hub portion adapted to be secured to a rotatable element for rotation thereby, an inertia rim portion comprising a plurality of segments spaced apart circumferentially to permit radial movement of the segments relative to the hub portion, and spring spoke connecting said hub and each rim segment, said spring spoke being resilient between the hub portion and rim segment to permit relative rotational movement between said rim segment and said hub.

10. A rotary inertia device comprising a hub portion adapted to be secured to a rotatable element for rotation thereby, a radially contractable and expansible inertia rim portion comprising a plurality of segments arranged in end to end relationship and circumferentially spaced apart to permit movement of the segments radially relative to said hub, the adjacent end of adjacent segments being interlocked against radial movement relative to each other, and means connecting said hub and each rim section, said means being resilient to permit relative rotational movement between said rim segments and said hub.

11. A rotary inertia device comprising a hub portion adapted to be secured to a rotatable element for rotation thereby, a radially contractable and expansible inertia rim portion comprising a plurality of segments arranged in end to end relationship and circumferentially spaced apart to permit movement of the segments radially relative to said hub, the adjacent end of adjacent segments being interlocked against radial movement relative to each other, means connecting said hub and each rim section, said means being resilient to permit relative rotational movement between said rim segments and said hub, and means resisting relative rotational movement between the rim segments.

12. A rotary inertia device comprising a hub portion adapted to be secured to a rotatable element for rotation thereby, an inertia rim portion, and spring spokes connecting said hub and rim portion, said spokes being yieldable to permit relative rotational movement between said inertia rim portion and said hub, said rim portion being radially expansible and contractable in response to the yielding of said spokes, and control means operable in accordance with the relative rotational movement between the hub and rim portion.

13. A rotary inertia device comprising a hub portion adapted to be secured to a rotatable element for rotation thereby, an inertia rim portion comprising a plurality of circumferentially spaced sections, means connecting said hub and each rim section, said means being yieldable to permit relative rotational movement between each of said rim sections and said hub, and control means carried by said hub portion and one of said rim sections and movable according to the relative rotational movement between the rim sections and the hub, into and out of engagement with each other for control purposes.

14. A rotary inertia device comprising a hub portion adapted to be secured to a rotatable element for rotation thereby, an inertia rim portion radially expansible and contractable, means connecting said hub and rim portion, said means being yieldable to permit relative rotational movement between said inertia rim portion and said hub portion, control elements carried by said hub portion and one of said rim portions and movable, according to the relative rotational movement between the rim and hub portions, into and out of engagement with each other for control purposes, and means operative according to the speed of said rim portion for adjusting the position of the control elements relative to each other.

15. A rotary inertia device comprising a hub portion adapted to be secured to a rotatable element for rotation thereby, an inertia rim portion, a spring secured at one end to said hub and secured at the other end to said rim portion, said spring being yieldable between its ends to permit relative rotational movement between said inertia rim portion and said hub portion, control means carried by said hub and rim portions and operative, according to the relative rotational movement between the rim portion and hub portion, into and out of engagement with each other for control purposes, and means operative according to the speed of said rim portion for adjusting the position of the control elements relative to each other.

16. A rotary inertia device comprising a hub portion adapted to be secured to a rotatable element for rotation thereby, an inertia rim portion, a spring connecting said hub and rim portion, said spring being yieldable to permit relative rotational movement between said inertia rim portion and said hub portion, and means subject to centrifugal force for adjusting the position of said control elements with relation to each other.

17. A rotary inertia device comprising a hub portion adapted to be secured to a rotatable element for rotation thereby, an inertia rim portion, a spring connecting said hub and inertia rim portions, said spring being yieldable to permit relative rotational movement between said inertia rim portion and said hub portion, a control element carried by said hub portion, a control element carried by said rim portion, the control elements being movable, according to the relative rotational movement between the hub and rim portions, into or out of engagement with each other for control purposes, and means operative according to the rotational speed of the rim portion for varying the position of one of said control elements relative to the other.

18. A rotary inertia device comprising a hub portion adapted to be secured to a rotatable element for rotation thereby, an inertia rim portion comprising a plurality of circumferentially spaced sections, means connecting said hub portion and each rim section, said means being yieldable to permit relative rotational movement between each of said rim sections and said hub, a control element carried by said hub portion, a control element carried by one of said rim sections, the control elements being movable, according to the relative rotational movement between the hub portion and said rim section, into or out of engagement with each other for control purposes, and means operative according to the rotational speed of said rim section for varying the position of one of said control elements relative to the other.

LARS O. GRONDAHL.